US012427088B2

(12) United States Patent
Shigemoto

(10) Patent No.: US 12,427,088 B2
(45) Date of Patent: Sep. 30, 2025

(54) MEDICAL PLUG

(71) Applicant: Sumitomo Rubber Industries, Ltd., Kobe (JP)

(72) Inventor: Hideyuki Shigemoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 425 days.

(21) Appl. No.: 18/081,699

(22) Filed: Dec. 15, 2022

(65) Prior Publication Data

US 2023/0190580 A1 Jun. 22, 2023

(30) Foreign Application Priority Data

Dec. 17, 2021 (JP) ................................ 2021-205022

(51) Int. Cl.
*A61J 1/14* (2023.01)

(52) U.S. Cl.
CPC ........... *A61J 1/1406* (2013.01); *A61J 1/1468* (2015.05)

(58) Field of Classification Search
CPC .......... A61J 1/1406; A61J 1/1468; A61J 1/14; B65D 51/002; B65D 39/0052; B65D 39/0076
See application file for complete search history.

(56) References Cited

U.S. PATENT DOCUMENTS 9,586,737 B2 * 3/2017 Klumpen ............ B65D 51/002

FOREIGN PATENT DOCUMENTS

| | | | | | |
|---|---|---|---|---|---|
| JP | 57-59536 | A | | 4/1982 | |
| JP | H07255821 | A | * | 3/1994 | |
| JP | 2001-340425 | A | | 12/2001 | |
| JP | 2005-297432 | A | | 10/2005 | |
| JP | 4908617 | B2 | | 4/2012 | |
| JP | 2016-5947 | A | | 1/2016 | |
| WO | WO-9906006 | A1 | * | 2/1999 | .......... B65D 51/002 |
| WO | WO-2009151129 | A1 | * | 12/2009 | ............ B32B 25/08 |

* cited by examiner

*Primary Examiner* — Ariana Zimbouski

(74) *Attorney, Agent, or Firm* — XSENSUS LLP

(57) ABSTRACT

A medical plug can include: a capping portion; and a leg portion extending downward from the capping portion. The medical plug can include a piercing portion in which a first portion located on the leg portion side and a second portion located on an upper surface side of the first portion can be provided, and the first portion and the second portion may not be adhered to each other.

17 Claims, 6 Drawing Sheets

MEDICAL PLUG

CROSS-REFERENCE TO RELATED APPLICATION(S)

The present application claims priority to Japanese Patent App. No. 2021-205022 filed Dec. 17, 2021, wherein the entire content and disclosure of which is incorporated herein by reference.

BACKGROUND

Field

The present disclosure relates to a medical plug. The present disclosure more specifically relates to a medical plug for sealing or plugging an infusion bag or a vial.

Background Art

Medical rubber products applied to pharmaceutical preparation containers can be required to have a high level of quality characteristics and a high level of physical properties. For example, quality characteristics that may be required of medical rubber plugs for sealing or plugging an opening of a vial preserving therein a preparation such as an antibiotic should, in terms of use of the medical rubber plugs, comply with the regulations stipulated in "Test for Rubber Closure for Aqueous Infusions" of the 17th edition of the Japanese Pharmacopoeia. Further, medical rubber plugs for, for example, sealing an opening of a vial can be required to have many characteristics such as resistance to gas permeation, non-oozing characteristics, high cleanability, chemical resistance, resistance to needle piercing, and self-sealability.

Japanese Laid-Open Patent Publication No. 2001-340425 describes a medical rubber plug that is applied to a port portion of a medical container and that has a piercing portion capable of being pierced by an injection needle of an injector. The medical rubber plug has an upper surface portion provided with a nylon film layer having a thickness of 20 to 200 μm.

Japanese Laid-Open Patent Publication No. 2005-297432 describes a plug manufacturing method as a two-stage molding method including: molding a leg portion; and then molding a capping portion while adhering the capping portion to the leg portion. The plug manufacturing method includes sandwiching, between the leg portion and the capping portion, a film made from a polymer alloy composed of at least one selected from the group consisting of olefin-based plastics and synthetic rubbers and at least one selected from among thermoplastic elastomers.

Japanese Laid-Open Patent Publication No. 2016-5947 describes a medical rubber plug including: a flange portion having the shape of a disc; and a leg portion formed so as to be contiguous with a lower surface side of the flange portion. A region on the lower surface side of the flange portion, and the leg portion, are each made from a nitrile-based rubber. A region on an upper surface side of the flange portion is made from a butyl-based rubber. The leg portion is laminated with a coating layer made from a fluorine-based resin film.

International Publication No. WO2009/151129 describes a rubber molded product for a cryogenic storage container, the rubber molded product being obtained by stacking a silicone rubber in which an elastomer has been blended and a butyl-based rubber or a silicone rubber in which an elastomer has been blended, with a polyethylene film having a molecular weight of 1 million to 7 million being interposed therebetween.

Japanese Laid-Open Patent Publication No. S57-59536 describes a rubber plug for a reduced-pressure blood collecting tube, the rubber plug being used for a reduced-pressure blood collecting tube in which the degree of reduction in the pressure thereof needs to be maintained. The rubber plug includes a film made from a material having gas barrier properties and a rubber plug body made from a thermoplastic elastomer. The rubber plug is configured to substantially prevent air from being diffused through the rubber plug into the reduced-pressure blood collecting tube.

A medical rubber plug for a medical container such as a vial can be subjected to operations of: piercing the medical rubber plug by an injection needle; and pulling out the injection needle after a medical preparation is suctioned from the medical container into the injector. When the injection needle is pulled out, a problem can arise in that a residual liquid in the medical container can leak from a gap formed through the piercing by the injection needle and can be scattered to the surroundings.

SUMMARY

A medical plug of the present disclosure can be a medical plug that can include: a capping portion; and a leg portion extending downward from the capping portion, wherein the medical plug can include a piercing portion in which a first portion located on the leg portion side and a second portion located on an upper surface side of the first portion can be provided, and the first portion and the second portion may not be adhered to each other.

DETAILED DESCRIPTION

Figure 1A:
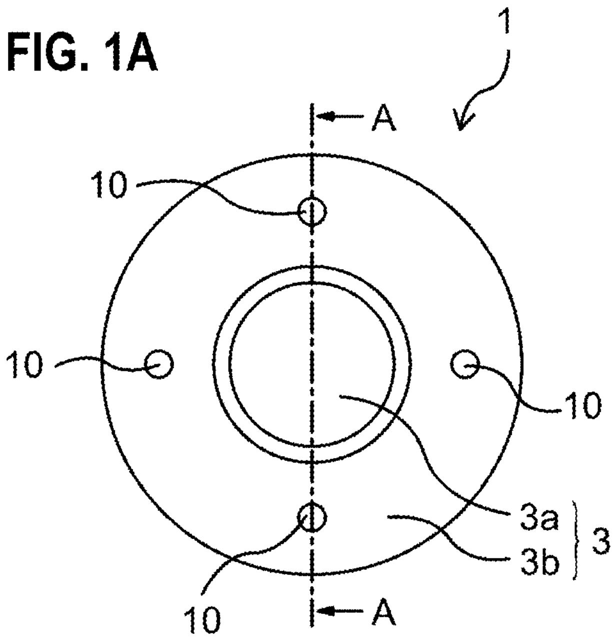
FIGS. 1A and 1B are each a diagram for explaining a medical plug according to one or more embodiments of the present disclosure.

The present disclosure has been made in view of the above circumstances in the Background Art section, and an object of the present disclosure, among one or more objects, is to provide a medical plug, which can be made of rubber, through which little or no residual liquid in a medical container leaks even when an injection needle is pulled out from the medical plug.

If the medical plug of the present disclosure is used, a residual liquid in a medical container may not or does not leak even when an injection needle is pulled out from the medical plug.

(1) Medical Plug

The medical plug of the present disclosure, which can be made of rubber, can be a medical plug that can include: a capping portion; and a leg portion extending downward from the capping portion, wherein the medical plug can include a piercing portion in which a first portion located on the leg portion side and a second portion located on an upper surface side of the first portion are provided, and the first portion and the second portion are not adhered to each other.

The medical plug of the present disclosure can have an up/down direction. The upper surface side can be defined as an upper side, and the leg portion side can be defined as a lower side. The medical plug of the present disclosure can include: the capping portion; and the leg portion extending downward from the capping portion.

The capping portion can have the shape of a disc. The diameter of the capping portion having the shape of a disc can be designed as appropriate according to the size of a medical container to be plugged.

The capping portion can include: the piercing portion capable of being pierced by an injection needle of an injector; and a flange portion which can be, when a medical container is plugged with the medical plug, brought into contact with an upper rim surface of a port portion of the medical container.

The piercing portion can be present at the center of the capping portion in a plan view of the medical plug. The piercing portion of the capping portion can have a circular shape in the plan view. The piercing portion can be formed in a shape recessed from an upper surface of the capping portion.

The upper surface of the capping portion can be provided with projections for imparting an effect of, when the medical plug is cleaned, sterilized, and dried, preventing close contact between the medical plug and another medical plug and/or preventing close contact between the medical plug and a cap rolled and fastened onto the medical plug.

Each projection can be a projection projecting from a part of an upper surface of the flange portion. The planar shape of the projection is not particularly limited and may be not only a circular shape or a nearly circular shape such as an elliptic shape, a semicircular shape, a fan shape, or an oval shape but also a nearly rectangular shape that is a track shape in which sides of a rectangle facing each other have been replaced with semicircles, or the like. These projections can have relatively small contact surfaces in consideration of: a case where, at the time of conveyance or cleaning in a parts feeder, the medical plug comes into close contact with a wall surface thereof; and a case where a large number of medical plugs are packed in a bag together. These projections can be projections that, when the medical plug is inverted, support a body of the medical plug over the entire circumference of an upper surface of the body not at surfaces but at points. The number of the projections can be 4 to 12, for instance. The projections can be arranged in a radial pattern or along the circumference of the flange portion, for instance.

The medical plug of the present disclosure can include the leg portion extending downward from a lower surface of the capping portion. When the medical container is plugged with the medical plug of the present disclosure, the leg portion can be fitted into a port portion of the medical container.

The shape of the leg portion can allow the leg portion to be fitted into the port portion of the medical container. Examples of the leg portion can include: a leg portion with a cylindrical continuous shape; and a plurality of leg portions in the forms of two or more branching portions.

The leg portion with a cylindrical continuous shape or the plurality of leg portions in the forms of two or more branching portions can have inner surfaces facing each other that can be formed in a tapered shape such that the distance between the inner surfaces of the leg portion(s) gradually decreases from the lower side to the upper side (upper surface side).

In one mode of the present disclosure, the medical plug can include a piercing portion in which: a first portion located on the leg portion side and a second portion located on an upper surface side of the first portion are provided; and the first portion and the second portion may not be adhered to each other in whole or in part.

The first portion can be a portion of the piercing portion that is located on the leg portion side, and can have a portion of the piercing portion that is located on the lower side of the capping portion. The first portion may have the leg portion in addition to the portion of the piercing portion that is located on the lower side of the capping portion.

The second portion can be a portion located on the upper surface side of the first portion and can have a portion of the piercing portion that is located on the upper side of the capping portion. The second portion may have the flange portion of the capping portion in addition to the portion of the piercing portion that is located on the upper side of the capping portion. The first portion and the second portion of the medical plug of the present disclosure can be, in the piercing portion, adjacent to each other in the up/down direction. That is, the boundary in the up/down direction between the first portion and the second portion can be present in the capping portion at the piercing portion.

Although the first portion and the second portion may not be adhered to each other in the piercing portion, the first portion and the second portion may be adhered to each other in a region other than the piercing portion. In this mode, when the injection needle is pulled out, the second portion can be elastically deformed so that a space is generated between the first portion and the second portion. The space can serve as a buffer space to accommodate a drug solution having leaked from the medical container. Thus, the medical plug of the present disclosure can enable reduction in liquid leakage.

Examples of a method to cause the first portion and the second portion not to be adhered each other can include: a method in which the leg portion and the capping portion are separately obtained through vulcanization molding, and, at the time of adhering the leg portion and the capping portion to each other by an adhesive agent, the adhesive agent may not be applied to either of piercing regions of the leg portion and the capping portion, and the adhesive agent can be applied to regions outside the piercing regions; and a method in which the leg portion is obtained through vulcanization molding, a mold release agent can be applied only to a piercing region of the upper surface of the molded leg portion, an unvulcanized rubber sheet can be stacked on the piercing region, and the capping portion can be obtained through vulcanization molding.

In another mode of the present disclosure, it can be that: the medical plug can include one film between the first portion and the second portion; and, in the piercing portion, the film can be adhered to one of the first portion and the second portion and not adhered to another one of the first portion and the second portion.

In this mode, when the injection needle is pulled out, the second portion can be elastically deformed so that a space can be generated between the film and either the first portion or the second portion that is not adhered to the film. The space can serve as a buffer space to accommodate the drug solution having leaked from the medical container. Thus, the medical plug of the present disclosure can enable reduction in liquid leakage.

A mode in which a material having a higher rigidity than a rubber material forming the first portion and/or the second portion can be used for the film. A space can be generated owing to the difference between the rigidity of the film and the rigidity of the first portion or the second portion.

It can be that: the medical plug can include at least two films between the first portion and the second portion; and, in the piercing portion, the first portion and a first film, out of the films, that is in contact with the first portion can be adhered to each other, the second portion and a second film, out of the films, that is in contact with the second portion can be adhered to each other, and the first film and the second film may not be adhered to each other.

In this mode, when the injection needle is pulled out, the second portion can be elastically deformed so that a space can be generated between the first film and the second film which are not adhered to each other. The space can serve as a buffer space to accommodate any of the drug solution that may have leaked from the medical container. Thus, the medical plug of the present disclosure enables reduction in liquid leakage.

The number of the films to be disposed between the first portion and the second portion can be two or more.

In the piercing portion, the shape of each film disposed between the first portion and the second portion can be, in the plan view, identical or similar to the shape of the piercing portion. Optionally, the shape in the plan view can be a circular shape. The proportion of the area of the film to the area of the piercing portion may be not lower than 60%, for instance, not lower than 70%, such as not lower than 80%. Meanwhile, the proportion may be not higher than 120%, for instance, not higher than 110%, such as not higher than 100%.

The film and the piercing portion can be arranged so as to overlap with each other in the plan view. In the case where the shapes of the film and the piercing portion are identical to each other, the film and the piercing portion can be arranged so as to be superposed on each other. In the case where the shapes of the film and the piercing portion are similar to each other, the film and the piercing portion can be arranged such that the centers of the similar shapes are present within the film and the piercing portion.

In the piercing portion, a resin film can be the film to be disposed between the first portion and the second portion. As the resin film, at least one resin film selected from the group consisting of fluorine resin, polyamide, and ultrahigh-molecular-weight polyethylene (UHMWPE) can be selected.

Examples of the fluorine resin can include at least one fluorine resin selected from the group consisting of polytetrafluoroethylene (PTFE), tetrafluoroethylene-ethylene copolymer (ETFE), tetrafluoroethylene-peralkyl vinyl ether copolymer (PFA), polychlorotrifluoroethylene (PCTFE), polyvinylidene fluoride (PVDF), and polyvinyl fluoride (PVF).

Tetrafluoroethylene-ethylene copolymer (ETFE) can be obtained by copolymerizing ethylene and tetrafluoroethylene in a molar ratio of 30/70 to 70/30, and examples of the ETFE can include a modified ETFE obtained by further copolymerizing another component for the purpose of modification. Examples of the other component can include fluorine-containing olefins and hydrocarbon-based olefins. Specific examples of the other component can include: α-olefins such as propylene and butene; fluorine-containing olefins such as hexafluoropropylene, vinylidene fluoride, perfluorobutylethylene, and trifluorochloroethylene; vinyl ethers such as ethyl vinyl ether, perfluoromethyl vinyl ether, and perfluoropropyl vinyl ether; fluorine-containing acrylates; and the like. About 2 to 10% by mole of the other component, for instance, can be copolymerized to modify the ETFE.

Examples of the polyamide can include polyamide 6, polyamide 66, polyamide 610, polyamide 621, polyamide 11, polyamide 12, copolymerized polyamide, monomer casting polyamide, polyamide MXD, polyamide 46, and the like. The polyamide may contain fluorine.

The thickness of the film can be relatively small. For instance, the thickness can be not smaller than 5 μm, and meanwhile, such as not larger than 150 μm, not larger than 100 μm, or not larger than 50 μm. A reason for this can be, for instance, because, if the thickness of the film is set to fall within the aforementioned range, a resistance at the time of piercing can decrease.

Examples of a method for adhesion between the film and the first portion or the second portion can include: a method involving adhesion by vulcanization; a method involving adhesion with an adhesive agent; a method involving usage of an adhesive film; and the like.

In the case of performing adhesion by vulcanization, it can be that: a region, of the film, that is to be adhered is subjected to surface roughening treatment; and a region, of the film, that is not to be adhered is not subjected to surface roughening treatment. A reason for this can be, for instance, because, if the surface of the film is subjected to surface roughening treatment, the film and rubber can be firmly fixed to each other through vulcanization molding without using any adhesive material or the like. This fixation can be achieved by the anchor effect in which vulcanized rubber enters the roughened inner surface of the film.

For roughening of the surface of the film, it can be possible to employ, for example, a method in which an ion beam is applied to the surface so that the molecular structure of the inside near the surface is destroyed to perform the roughening (see, for example, Japanese Patent No. 4908617). Examples of the surface roughening treatment for the film can include, in addition to the ion beam treatment, glow discharge treatment, plasma treatment (discharge treatment) under atmospheric pressure or under a vacuum, excimer laser treatment (discharge treatment), and the like. Further, examples of the treatment for increasing the adhesiveness between the rubber and the film can include, in addition to the surface roughening treatment for the film, chemical treatment in which surface treatment is performed by using an acid, an alkali (for example, sodium hydroxide), or the like. In this case, it can be that the region, of the film, that is not to be adhered may not be subjected to the chemical treatment.

The adhesive agent for adhesion between the film and the first portion or the second portion can be: a thermosetting resin adhesive agent containing, as a component, at least one resin among phenol resins, resorcin resins, furan resins, polyurethane, epoxy resins, or silicone resins; a thermoplastic resin adhesive agent containing, as a component, at least one resin among polyvinyl acetate, polyvinyl chloride, or polyacrylic acid esters; an elastomer adhesive agent containing, as a component, at least one of butadiene acrylonitrile rubber or neoprene; and the like.

Examples of the method for the adhesion can include a method in which an adhesive film having functional groups in surfaces thereof is used as a film. The adhesive film can have adhesiveness to rubber owing to an effect of functional groups that are present in the surfaces of the adhesive film. In a method in which an adhesive film, both surfaces of which have adhesiveness to rubber owing to the effect of the functional groups, can be used, functional groups on the first portion side (leg portion side) are not deactivated but functional groups on the second portion side (upper surface side) are deactivated at the time of a first stage of vulcanization molding as described later. Therefore, the adhesive film can be adhered to the first portion but is not adhered to the second portion (on the upper surface side). As the adhesive film, it can also be possible to use an adhesive film, only one surface of which has adhesiveness to rubber owing to the effect of the functional groups.

Examples of the adhesive film having functional groups can include modified ETFE. Examples of the functional groups include a carboxyl group, a carboxylic anhydride group, an epoxy group, a hydroxy group, an isocyanate group, an ester group, an amide group, an aldehyde group, an amino group, a cyano group, a carbon-carbon double bond, a sulfonic acid group, an ether group, and the like. Examples of commercially available modified ETFEs include Fluon AH-2000 manufactured by AGC Inc., and the like.

The leg portion of the medical plug may be laminated with a resin film or coated with a silicone lubricant. The lamination or the coating can make it possible to prevent close contact between medical plugs and smoothly convey, by a parts feeder, the medical plugs each having an inverted posture with the upper surface of the capping portion being oriented to a conveyance surface. Not only the leg portion but also the upper surface of the capping portion can be laminated, and the resin film can be used in the same manner as in the case of the leg portion.

The thickness of the resin film used for lamination of the upper surface or the leg portion can be 25 μm to 150 μm, for instance, 50 μm to 100 μm. If the thickness is smaller than 25 μm, there can be a tendency that the film is torn at many locations during molding. Meanwhile, if the thickness is larger than 150 μm, there can be a tendency that: the dimensional stability of a molded product decreases; and cost for the molded product increases so that the molded product can become uneconomical.

Examples of the resin film can include films made from inactive resins such as polytetrafluoroethylene (PTFE), tetrafluoroethylene-ethylene copolymer (ETFE), modified products thereof, and ultrahigh-molecular-weight polyethylene (UHMWPE). Among these resin films, a film made from a fluorine resin may be used since such a film can be inactive, can have excellent heat resistance, chemical resistance, and non-adhesiveness, and can have a lower friction resistance than rubber.

According to one or more embodiments, resin film may only have to be, for example, press-molded in a state of being superposed on a rubber composition having the shape of a sheet such that the resin film is integrated with the medical rubber part formed after the press-molding.

As a type of sterilization for the medical plug, sterilization with vapor, sterilization with ethylene oxide gas, or sterilization with gamma ray can be performed, and meanwhile, PTFE has a low resistance to gamma ray. Considering this, ETFE, modified ETFE, and PCTFE each having a high resistance to sterilization with gamma ray can be implemented.

The upper side of the capping portion can be covered with a cap that can be made from metal (for example, aluminum) or resin and that can cover an opening end of the medical container and the medical plug. A purpose of tightly closing the medical plug together with the opening end of the medical container by using the cap can be to prevent bacteria from adhering at a location at which the piercing portion is to be pierced by an injection needle of an injector, and thus can prevent bacteria from entering an injection drug solution from the injection needle. Regarding the type of the cap, a flip-off cap, a pull-top cap, a clean cap, or the like can be used. In the case where a relatively large amount of injection drug solution is used as in a hospital, it can be desirable to use a clean cap that can be opened with one hand, for instance, and that can be easy to handle.

A thermoplastic resin or a thermoplastic resin composition having a melting point, obtained according to the measurement method stipulated in ASTM-D2117, of 100° C. to 500° C. can be used as a material for the cap. A reason for this can be because such a thermoplastic resin or thermoplastic resin composition can be easily molded through injection molding. Specific examples of the thermoplastic resin and the thermoplastic resin composition can include: a synthetic resin composed of one or more selected from among polyacetal (POM), polyamide (PA), polyarylate (PAR), polyether ether ketone, ethylene-propylene copolymer, polypropylene (PP), polyethylene terephthalate (PET), liquid crystal polyester (LCP), polyphenylene ether (PPE), modified polyphenylene ether, polycarbonate (PC), polymethylpentene (PMP), polyurethane (PU), polyethylene (PE), polybutylene phthalate, polysulfone (PS), polyethersulfone (PES), ultrahigh-molecular-weight polyethylene, cyclic olefin-based compounds, copolymers containing a cross-linked polycyclic hydrocarbon as a polymer component, and the like; and a composition of the synthetic resin. If a thermoplastic resin obtained by blending an organic-based reinforcing agent or an inorganic-based reinforcing agent with a thermoplastic elastomer forming the plug is used, a cap having a very high hardness and a very high strength can be obtained.

(2) Medical Rubber Composition

The medical plug of the present disclosure can be formed from a medical rubber composition containing a (a) rubber component. As the (a) rubber component, isobutylene-isoprene rubber can be implemented, for instance, or halogenated isobutylene-isoprene rubber can be implemented, for instance, in terms of chemical resistance and resistance to gas permeation. Examples of the halogenated isobutylene-isoprene rubber can include: chlorinated isobutylene-isoprene rubber; brominated isobutylene-isoprene rubber; a bromide of a copolymer of isobutylene and p-methylstyrene; and the like. As the halogenated isobutylene-isoprene rubber, a chlorinated isobutylene-isoprene rubber or a brominated isobutylene-isoprene rubber is preferable. The chlorinated isobutylene-isoprene rubber or the brominated isobutylene-isoprene rubber can be obtained by, for example, causing a reaction in which: chlorine or bromine is added to an isoprene structural moiety (specifically, a double bond and/or a carbon atom adjacent to the double bond) in an isobutylene-isoprene rubber; or the isoprene structural moiety is substituted with chlorine or bromine. The isobutylene-isoprene rubber can be a copolymer obtained by polymerizing isobutylene and a small amount of isoprene.

The (a) rubber component may contain a rubber component other than isobutylene-isoprene rubber. Examples of the other rubber component can include isoprene rubber, butadiene rubber, styrene-butadiene rubber, natural rubber, chloroprene rubber, nitrile-based rubbers such as acrylonitrile butadiene rubber, hydrogenated nitrile-based rubbers, norbornene rubber, ethylene-propylene rubber, ethylene-propylene-diene rubber, acrylic rubber, ethylene-acrylate rubber, fluororubber, chlorosulfonated polyethylene rubber, epichlorohydrin rubber, silicone rubber, urethane rubber, polysulfide rubber, phosphazene rubber, 1,2-polybutadiene rubber, and the like. These rubber components may be used singly, or two or more of these rubber components may be used in combination.

In the case of using the other rubber component, the proportion of the isobutylene-isoprene rubber contained in the (a) rubber component can be not lower than 90% by mass, for instance, not lower than 95% by mass, such as not lower than 98% by mass. A mode in which the (a) rubber component contains only the halogenated isobutylene-isoprene rubber may be implemented.

The medical rubber composition according to one or more embodiments of the present disclosure can further contain a (b) crosslinking agent. The (b) crosslinking agent can be blended to cause crosslinking in the (a) rubber component. The (b) crosslinking agent can cause crosslinking in rubber. Examples of the (b) crosslinking agent can include sulfurs, metal oxides, resin crosslinking agents, organic peroxides, triazine derivatives, and the like. These crosslinking agents may be used singly, or two or more of these crosslinking agents may be used in combination.

In the medical rubber composition according to one or more embodiments of the present disclosure, the amount of the (b) crosslinking agent contained per 100 parts by mass of the (a) rubber component can be not smaller than 0.2 parts by mass, for instance, not smaller than 0.4 parts by mass, such as not smaller than 0.6 parts by mass. Meanwhile, the amount can be not larger than 20 parts by mass, for instance, not larger than 15 parts by mass, such as not larger than 10 parts by mass. A reason for this can be because, if the amount of the (b) crosslinking agent falls within the aforementioned range, a rubber having favorable rubber physical properties (hardness, tensile properties, Cset) and good processability (less susceptibility to scorching) can be obtained.

The medical rubber composition according to one or more embodiments of the present disclosure can contain no vulcanization accelerator. A reason for this can be because a vulcanization accelerator could remain in a rubber product obtained as a final product and could ooze into a drug solution inside a vial. Examples of the vulcanization accelerator can include guanidine-based accelerators (e.g., diphenylguanidine), thiuram-based accelerators (e.g., tetramethylthiuram disulfide and tetramethylthiuram monosulfide), dithiocarbamate-based accelerators (e.g., zinc dimethyldithiocarbamate), thiazole-based accelerators (e.g., 2-mercaptobenzothiazole and dibenzothiazyl disulfide), and sulfenamide-based accelerators (N-cyclohexyl-2-benzothiazole sulfenamide and N-t-butyl-2-benzothiazole sulfenamide).

The medical rubber composition according to one or more embodiments of the present disclosure may contain a (c) hydrotalcite. The (c) hydrotalcite can function as an anti-scorching agent upon crosslinking in the halogenated isobutylene-isoprene rubber and can also have a function of preventing increase in permanent strain upon compression in the medical rubber part. Further, the hydrotalcite can also function as an acid acceptor for absorbing chlorine-based gas and bromine-based gas, which have been generated upon crosslinking in the halogenated isobutylene-isoprene rubber, and preventing occurrence of, for example, crosslinking inhibition due to these gases. Magnesium oxide can also function as an acid acceptor.

Examples of the hydrotalcite can include one or more of Mg—Al-based hydrotalcites such as $Mg_{4.5}Al_2(OH)_{13}CO_3\cdot3.5H_2O$, $Mg_{4.5}Al_2(OH)_{13}CO_3$, $Mg_4Al_2(OH)_{12}CO_3\cdot3.5H_2O$, $Mg_6Al_2(OH)_{16}CO_3\cdot4H_2O$, $Mg_5Al_2(OH)_{14}CO_3\cdot4H_2O$, and $Mg_3Al_2(OH)_{10}CO_3\cdot1.7H_2O$, and the like.

In the medical rubber composition according to one or more embodiments of the present disclosure, a (d) filler may further be blended. Examples of the (d) filler can include inorganic fillers such as clay and talc, resin powders of olefin-based resins, resin powders of styrene-based elastomers, and resin powders of ultrahigh-molecular-weight polyethylene (UHMWPE). Among these fillers, an inorganic filler can be implemented, such as clay or talc. The filler can have a function of adjusting the rubber hardness of the medical rubber part and functions also as an extender for reducing manufacturing cost for the medical rubber part.

In the medical rubber composition according to one or more embodiments of the present disclosure, the amount of the (d) filler can be set as appropriate according to a target rubber hardness of the medical rubber part and the like. In the medical rubber composition according to one or more embodiments of the present disclosure, the amount of the (d) filler contained per 100 parts by mass of the (a) rubber component can be, for example, not smaller than 5 parts by mass, for example, not smaller than 10 parts by mass, such as not smaller than 20 parts by mass. Meanwhile, the amount can be not larger than 200 parts by mass, for instance, not larger than 150 parts by mass, such as not larger than 100 parts by mass.

In the medical rubber composition according to one or more embodiments of the present disclosure, a colorant such as titanium oxide or carbon black, stearic acid or low-density polyethylene (LDPE) as a lubricant, polyethylene glycol as a processing aid or as a crosslinking activator, a plasticizer (for example, paraffin oil), and the like may further be blended in appropriate proportions.

(3) Manufacturing Method for Medical Plug

The medical plug according to one or more embodiments of the present disclosure can be manufactured through a two-stage molding method by using the medical rubber composition. Specifically, the manufacturing method for the medical plug according to one or more embodiments of the present disclosure can include: a step of making the first portion on the leg portion side; and a step of making the second portion on the upper surface side.

The medical rubber composition of the present disclosure can be obtained by kneading the (a) rubber component and other blending materials to be added as necessary. The kneading can be performed by using, for example, an open roll, a sealed-type kneader, or the like. A kneaded product can be molded in the shape of a ribbon, the shape of a sheet, the shape of a pellet, or the like.

If the kneaded product having the shape of a ribbon, the shape of a sheet, or the shape of a pellet is press-molded, a medical plug having a desired shape can be obtained. A crosslinking reaction in the medical rubber composition can progress during the pressing. The temperature in the molding can be, for example, not lower than 130° C., for instance, not lower than 140° C. Meanwhile, the temperature can be not higher than 200° C., for instance, not higher than 190° C. The time for the molding can be not shorter than 2 minutes, for instance, not shorter than 3 minutes. Meanwhile, the time can be not longer than 60 minutes, for instance, not longer than 30 minutes. The pressure for the molding can be not lower than 0.1 MPa, for instance not lower than 0.2 MPa. Meanwhile, the pressure can be not higher than 10 MPa, for instance, not higher than 8 MPa.

Hereinafter, the present disclosure will be described with reference to the drawings, but the present disclosure is not limited to modes shown in the drawings.

Figure 1B:
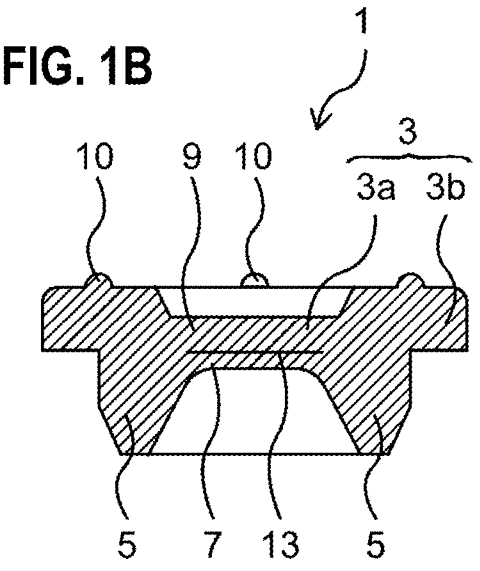

FIGS. 1A and 1B are each a diagram for explaining an example of a medical plug according to one or more embodiments of the present disclosure. FIG. 1A is a plan view, and FIG. 1B is a cross-sectional view taken at a line A-A in FIG. 1A.

A medical plug 1 according to one or more embodiments of the present disclosure can include a leg portion 5, which may be cylindrical, extending downward from a lower surface of a capping portion 3. When a medical container is plugged with the medical plug 1 according to one or more embodiments of the present disclosure, the leg portion 5 can be fitted into a port portion of the medical container. In FIG. 1B, the leg portion 5 can have inner surfaces facing each other that are formed, for instance, in a tapered shape such that the distance between the inner surfaces of the leg portion 5 gradually decreases from the lower side to the upper side (upper surface side). The medical plug 1 may be made of rubber, for instance.

The capping portion 3 can have a circular shape in the plan view. The capping portion 3 can include: a piercing portion 3*a* capable of being pierced by an injection needle of an injector; and a flange portion 3*b* which can be, when the medical container is plugged with the medical plug 1, brought into contact with an upper rim surface of the port portion of the medical container.

Projections 10 can prevent close contact with another medical plug and can be provided on the upper surface side of the flange portion 3*b*.

The piercing portion 3*a* can be a region, of the capping portion 3, in which the injection needle is inserted in order to suction a drug solution inside the container. The piercing portion 3*a* can have a circular shape in the plan view and can be present at the center of the capping portion 3. The piercing portion 3*a* can be formed in a shape recessed from the upper surface.

In the piercing portion 3*a* in the medical plug 1 according to one or more embodiments of the present disclosure, a first portion 7 located on the leg portion side and a second portion 9 located on the upper surface side of the first portion 7 can be provided. The first portion 7 and the second portion 9 can be adjacent to each other in the up/down direction. In FIG. 1B, a boundary line 13 indicates the boundary between the first portion 7 and the second portion 9. In the medical plug 1 according to one or more embodiments of the present disclosure, the first portion 7 and the second portion 9 may not be adhered to each other in the piercing portion 3*a*.

With such a configuration, when the injection needle is pulled out, the second portion 9 can elastically deform so that a space is formed between the first portion 7 and the second portion 9. The space can serve as a buffer space to accommodate any of the drug solution having leaked from the medical container. Thus, the medical plug 1 according to one or more embodiments of the present disclosure can enable reduction in liquid leakage.

Figure 2A:
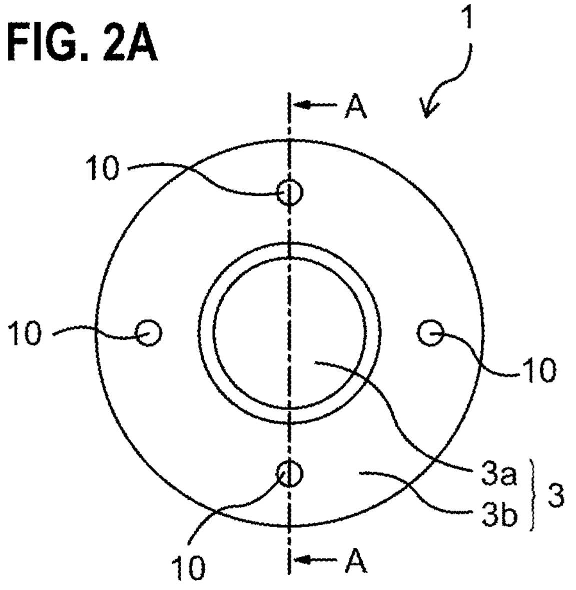
FIGS. 2A and 2B are each a diagram for explaining a medical plug according to one or more embodiments of the present disclosure.
Figure 2B:
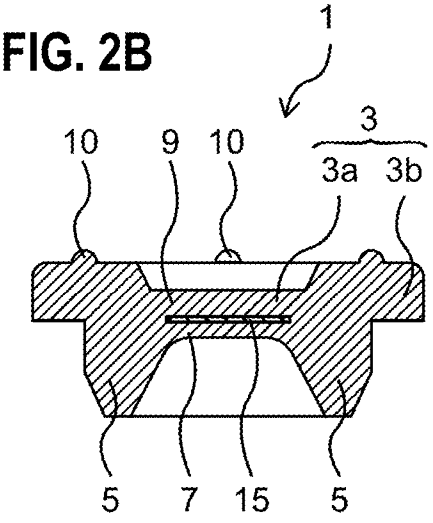

FIGS. 2A and 2B are each a diagram for explaining another mode of the medical plug 1 according to one or more embodiments of the present disclosure. FIG. 2A is a plan view, and FIG. 2B is a cross-sectional view taken at a line A-A in FIG. 2A. The medical plug 1, which can be made of rubber, in the present mode can include one film 15 between the first portion 7 and the second portion 9. Descriptions about portions, of the medical plug 1 in FIGS. 2A and 2B, that share the configurations of the corresponding portions in FIGS. 1A and 1B, will be omitted.

In the piercing portion 3*a*, the film 15 can be adhered to one of the first portion 7 and the second portion 9 and may not be adhered to the other one of the first portion 7 and the second portion 9.

In this configuration as well, when the injection needle is pulled out, the second portion 9 can elastically deform so that a space is formed between the film 15 and either of the first 7 and the second portion 9 to which the film is not adhered. The space can serve as a buffer space to accommodate any of the drug solution that may have leaked from the medical container. Thus, the medical plug 1 according to one or more embodiments of the present disclosure can enable reduction in liquid leakage.

The film 15 can be disposed so as to extend over the entirety in the horizontal direction of the piercing portion 3*a*. The film 15 and the piercing portion 3*a* can be arranged so as to overlap with each other in the plan view.

Figure 3A:
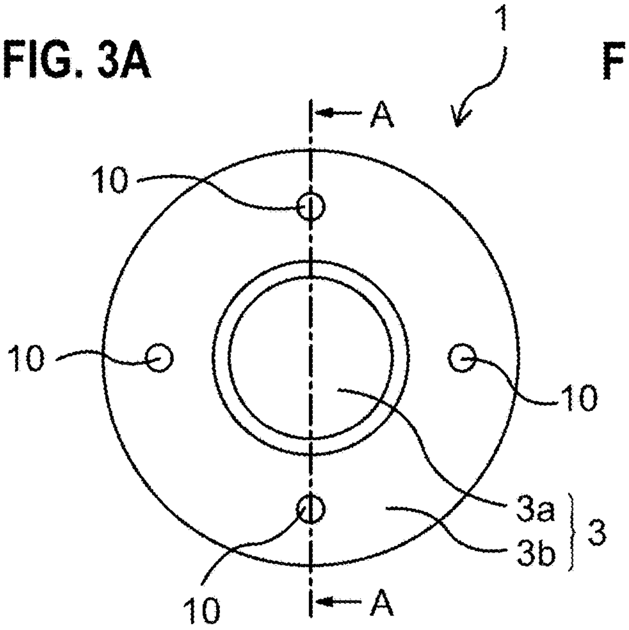
FIGS. 3A and 3B are each a diagram for explaining a medical plug according to one or more embodiments of the present disclosure.
Figure 3B:
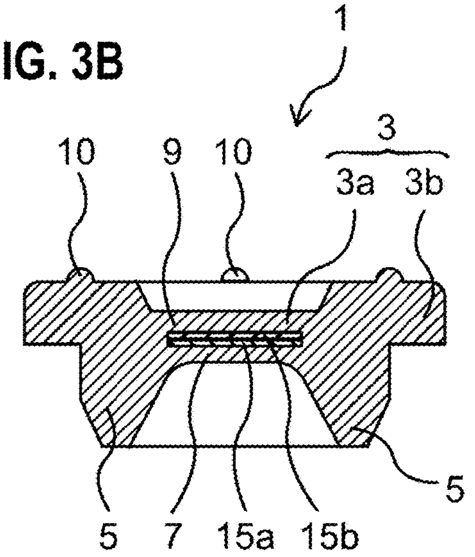

FIGS. 3A and 3B are each a diagram for explaining another mode of the medical plug 1 according to one or more embodiments of the present disclosure. FIG. 3A is a plan view, and FIG. 3B is a cross-sectional view taken at a line A-A in FIG. 3A. Descriptions about portions, of the medical plug 1 in FIGS. 3A and 3B, that share the configurations of the corresponding portions in FIGS. 1A and 1B, will be omitted.

The medical plug 1, which can be made of rubber, in the present mode can include two films 15*a* and 15*b* between the first portion 7 and the second portion 9, and, in the piercing portion, the first portion 7 and a first film 15*a*, out of the films, that is in contact with the first portion 7 can be adhered to each other, the second portion 9 and a second film 15*b*, out of the films, that is in contact with the second portion 9 can be adhered to each other, and the first film 15*a* and the second film 15*b* may not be adhered to each other.

In this configuration as well, when the injection needle is pulled out, the second portion 9 can elastically deform so that a space is formed between the first portion 7 and the second portion 9. The space can serve as a buffer space to accommodate any of the drug solution that may have leaked from the medical container. Thus, the medical plug 1 according to one or more embodiments of the present disclosure can enable reduction in liquid leakage.

Figure 4A:
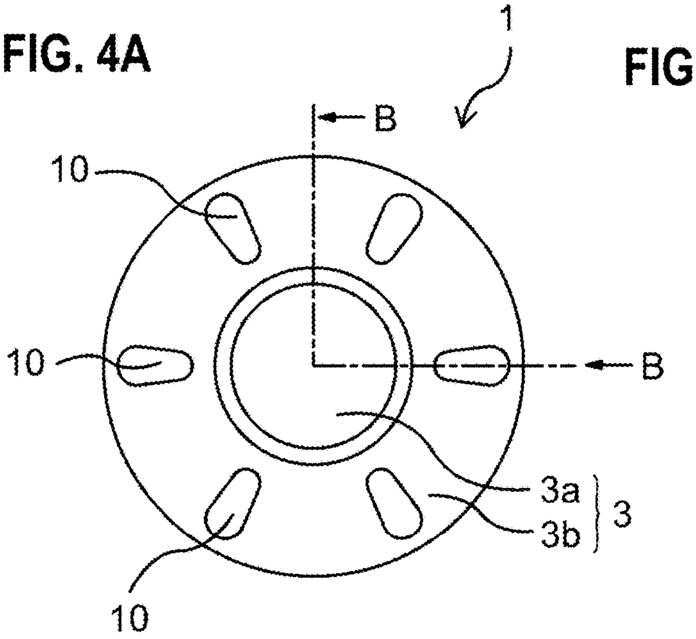
FIGS. 4A and 4B are each a diagram for explaining a medical plug according to one or more embodiments of the present disclosure.
Figure 4B:
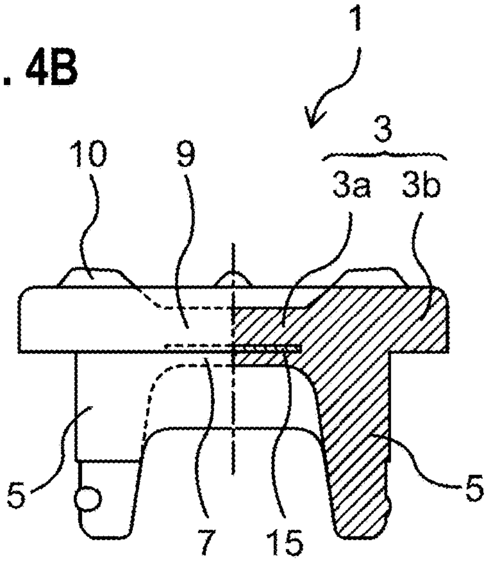

FIGS. 4A and 4B are each a diagram for explaining another mode of the medical plug 1 according to one or more embodiments of the present disclosure. FIG. 4A is a plan view, and FIG. 4B is a cross-sectional view taken at a line B-B in FIG. 4A. Descriptions about portions, of the medical plug 1 in FIGS. 4A and 4B, that share the configurations of the corresponding portions in FIGS. 1A and 1B, will be omitted.

The medical plug 1 in the present mode can include leg portions 5, which may be in the form of two branching portions extending from the lower surface of the capping portion 3. In FIG. 4B, the leg portions 5 in the form of two branching portions can have inner surfaces facing each other that can be formed in a tapered shape, for instance, such that the distance between the inner surfaces of the leg portions can gradually decrease from the lower side to the upper side (upper surface side).

The medical plug 1 in the present mode can include one film 15 between the first portion 7 and the second portion 9. In the piercing portion, the film 15 can be adhered to one of the first portion 7 and the second portion 9 and may not be adhered to the other one of the first portion 7 and the second portion 9.

In this configuration as well, when the injection needle is pulled out, the second portion 9 can elastically deform so that a space can be formed between the film 15 and either of the first portion 7 and the second portion 9 to which the film is not adhered. The space can serve as a buffer space to accommodate any of the drug solution that may have leaked from the medical container. Thus, the medical plug 1 according to one or more embodiments of the present disclosure can enable reduction in liquid leakage.

Figure 5:
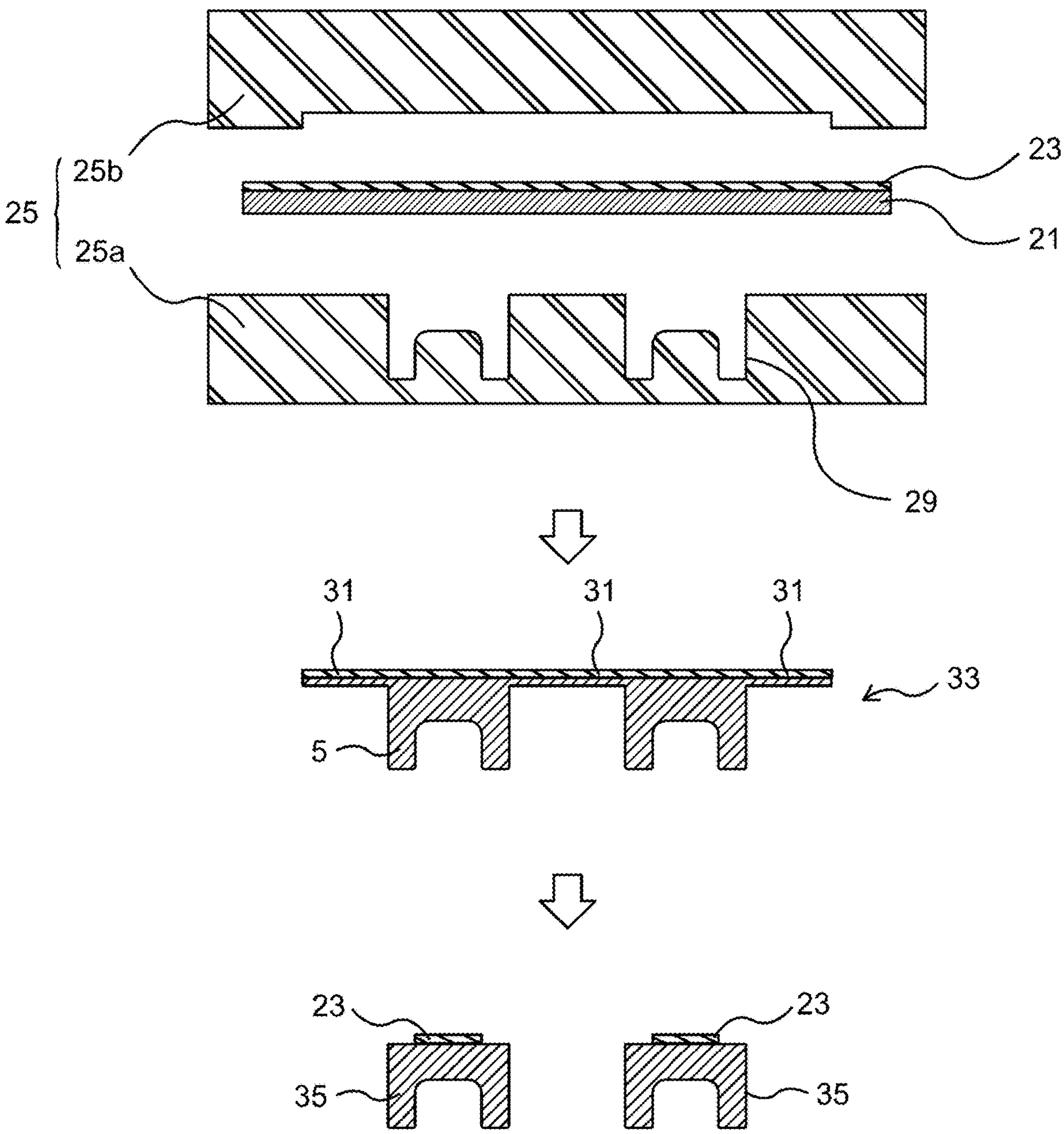
FIG. 5 is a diagram for schematically explaining a manufacturing process for a medical plug according to one or more embodiments of the present disclosure.
Figure 6:
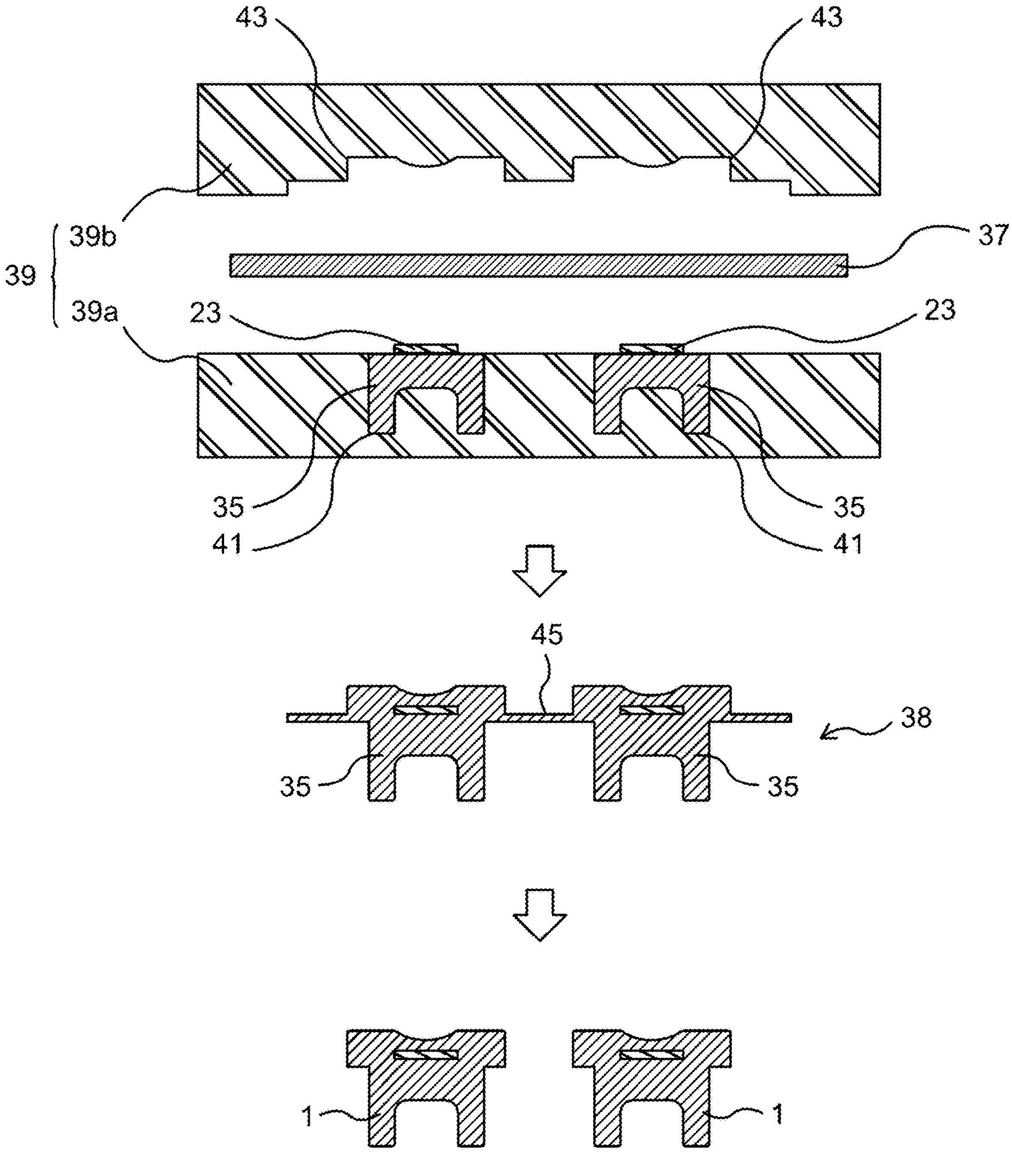
FIG. 6 is a diagram for schematically explaining the manufacturing process for a medical plug according to one or more embodiments of the present disclosure.

FIG. 5 and FIG. 6 are each a diagram for schematically explaining a manufacturing method for a medical plug (e.g., medial plug 10) according to one or more embodiments of the present disclosure, which can be made of rubber, at least in part. With reference to FIG. 5 and FIG. 6, descriptions will be given regarding a manufacturing example for the medical plug 1 including the one film between the first portion 7 and the second portion 9, the film 15 being, in the piercing portion 3*a*, adhered to the first portion 7 and not adhered to the second portion 9. However, the manufacturing method for the medical plug 1 according to one or more embodiments of the present disclosure is not limited to the mode shown in the drawings.

FIG. 5 is a diagram for schematically explaining a first step of making the first portion of on the leg portion side of the medical plug 1. First, an unvulcanized rubber sheet 21 for forming the first portion 7 on the leg portion side of the medical plug 1 can be prepared. As the unvulcanized rubber sheet 21, it can be possible to use a sheet obtained by blending, in arbitrarily-defined proportions, various additives such as crosslinking components for rubber vulcanization (crosslinking) such as a crosslinking agent, an accelerator, and an acceleration aid, fillers for adjusting hardness such as silica, clay, and talc, and furthermore, a processing aid, a softener, and a colorant, kneading the resultant mixture, and molding the kneaded product into the shape of a sheet.

A film 23 to be provided between the first portion 7 and the second portion 9 of the medical plug 1 according to one or more embodiments of the present disclosure can be prepared. The film 23 can be stacked on the unvulcanized rubber sheet 21. At this time, surface roughening treatment can be performed in advance on a side, of the film 23, that is brought into contact with the rubber sheet 21. Surface roughening treatment may not be performed on a side, of the film 23, that is not brought into contact with the rubber sheet 21.

The obtained stack sheet can be supplied between a lower mold portion 25*a* and an upper mold portion 25*b* of a primary mold 25 heated to a rubber vulcanization temperature. The lower mold portion 25*a* can have a plurality of recesses 29 each corresponding to the shape of the leg portion 5 of the medical plug 1.

Then, vulcanization molding can be performed on the stack sheet through mold clamping between the lower mold portion 25*a* and the upper mold portion 25*b*. This can lead to formation of a primary molded product 33 in which: a plurality of the leg portions 5 corresponding to the above recesses 29 can be formed so as to be contiguous with each other by burrs 31; and the upper sides, including the entire surfaces, of the leg portions 5 can be formed so as to be contiguous with each other are laminated with the film 23. Since surface roughening treatment may have been performed on the surface of the film 23 that is in contact with the rubber sheet 21, the film 23 can be adhered by vulcanization to each first portion 7 formed on the leg portion side.

Then, the individual leg portions 5 can be stamped out of the primary molded product 33 having been subjected to the molding, whereby plug intermediates 35 can be made. In each plug intermediate 35, in order to cause the film 23 to remain only on the upper side of the piercing portion, the rest of the film can be removed from the plug intermediate 35.

FIG. 6 is a diagram for schematically explaining a step of making the second portion 9 on the upper surface side of the medical plug 1 according to one or more embodiments of the disclosed subject matter. An unvulcanized rubber sheet 37 for forming the second portion of the medical plug can be prepared.

As the unvulcanized rubber sheet 37, it can be possible to use the same type of rubber sheet as the aforementioned rubber sheet 21.

The plug intermediates 35 made in the aforementioned step can be supplied between a lower mold portion 39*a* having a plurality of recesses 41 each corresponding to the shape of the leg portion 5 and an upper mold portion 39*b* having a plurality of recesses 43 each corresponding to the shape of the flange portion 3*b*, of a secondary mold 39 heated to the rubber vulcanization temperature. Each plug intermediate 35 can be set in the corresponding recess 41 of the lower mold portion 39*a*.

The rubber sheet 37 can be stacked on the plug intermediates 35, and vulcanization molding can be performed on the sheet 37 through mold clamping between the lower mold portion 39*a* and the upper mold portion 39*b*. This can lead to formation of a secondary molded product 38 in which: a plurality of the flange portions 3*b* corresponding to the above recesses 43 can be formed so as to be contiguous with each other by burrs 45; and the plug intermediates 35 (leg portions 5) can be adhered by vulcanization to the lower surfaces of the flange portions 3*b* formed so as to be contiguous with each other. At this time, since surface roughening treatment may not have been performed on the upper surface sides of the films 23, each film 23 can be in a state of being not adhered to the corresponding second portion formed on the upper surface side.

The individual capping portions can be stamped out of the secondary molded product 38 having been formed, whereby one or more of the medical plugs 1 can be formed. Thereafter, each medical plug 1 having been manufactured can be made as a product through, for example, a cleaning step, a sterilization step, a drying step, an outer appearance inspection step, and a packaging step.

The mode shown in FIG. 5 and FIG. 6 has been described based on the method involving roughening the film as a method for adhesion between the film and the first portion or the second portion. However, the method for adhesion between the film and the first portion or the second portion can be changed, as appropriate, to a method involving usage of an adhesive agent or a method involving usage of an adhesive film.

Figure 7A:
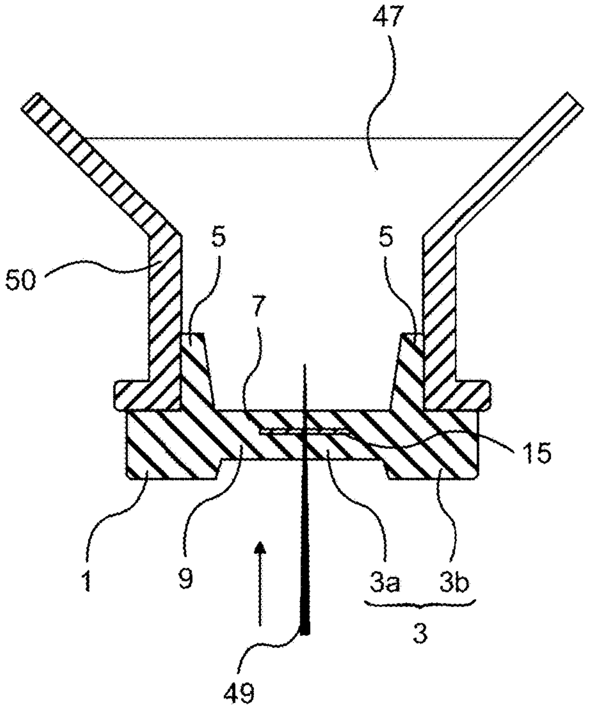
FIGS. 7A and 7B are each a cross-sectional view for schematically explaining an advantageous effect, from among one or more advantageous effects, of a medical plug according to one or more embodiments of the present disclosure.
Figure 7B:
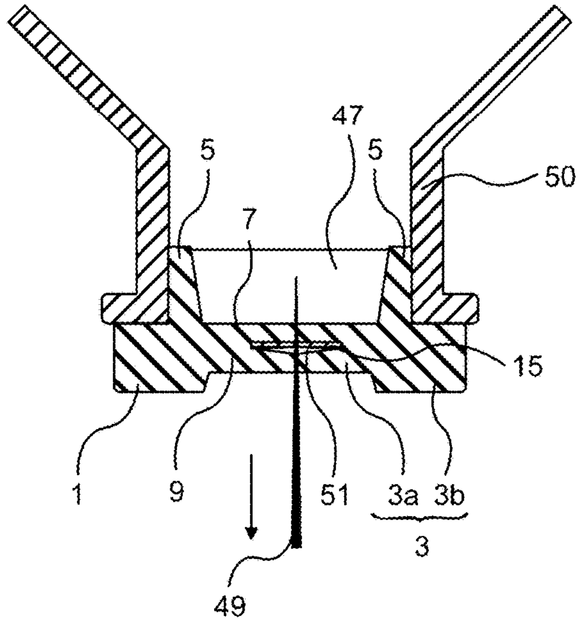

FIGS. 7A and 7B are each a cross-sectional view for schematically explaining an advantageous effect (of one or more advantageous effects) in a vial plugged with the medical plug 1 according to one or more embodiments of the present disclosure. FIGS. 7A and 7B each show a state where an opening of a vial 50 filled with a pharmaceutical preparation is closed by the medical plug 1. The medical plug 1 can include the capping portion 3 and the leg portion 5. The capping portion 3 can include: the piercing portion 3*a* capable of being pierced by an injection needle of an injector; and the flange portion 3*b* in contact with an upper rim surface of a port of a medical container 50. The leg portion 5 can project from the lower surface (the upper surface in FIGS. 7A and 7B) of the capping portion 3 and can be fitted into the port of the medical container.

The medical plug 1 in the present mode can include the one film 15 between the first portion 7 and the second portion 9, and, in the piercing portion 3*a*, the film 15 can be adhered to the first portion 7 and may not be adhered to the second portion 9.

FIG. 7A schematically shows a state where the piercing portion 3*a* is pierced by an injection needle 49 of an injector in order to suction a drug solution 47 into the injector. FIG. 7B schematically shows a state where the injection needle 49 is being pulled out after the drug solution 47 is suctioned into the injector. When the injection needle 49 is pulled out, the second portion 9 of the medical plug 1 can elastically deform by friction force due to the pull-out of the injection needle 49 so that a space 51 can be generated between the second portion 9 and the film 15 adhered to the first portion 7. A residual liquid in the medical container that may have leaked from a gap formed through the piercing by the injection needle can be accommodated in the space 51. As a result, the residual liquid can be inhibited from leaking to the outside of the medical container.

With reference to FIGS. 7A and 7B, description has been given based on the mode in which the film 15 is adhered to the first portion 7 and not adhered to the second portion 9. Meanwhile, in the case where, for example, the film 15 is not adhered to the first portion 7 and is adhered to the second portion 9, when the injection needle 49 is pulled out, a space 51 can be formed between the first portion 7 and the film 15 adhered to the second portion 9.

Figure 8A:
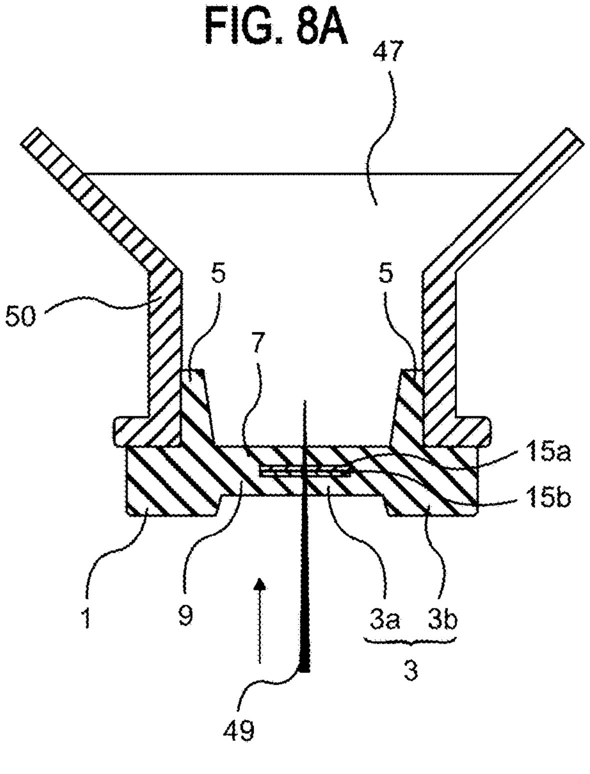
FIGS. 8A and 8B are each a cross-sectional view for schematically explaining an advantageous effect, from among one or more advantageous effects, of the medical plug according to one or more embodiments of the present disclosure.
Figure 8B:
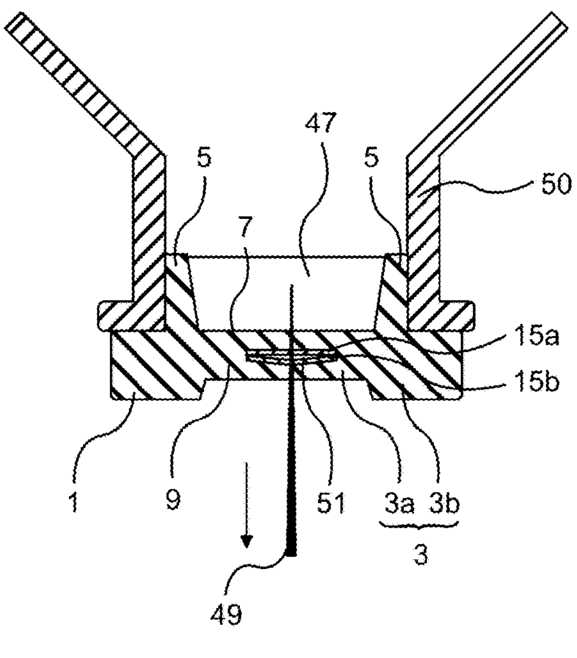

FIGS. 8A and 8B are each a cross-sectional view for schematically explaining an advantageous effect (of one or more advantageous effects) in a vial plugged with the medical plug 1 in another one of the modes of the present disclosure. The medical plug 1 in the present mode can include the two films 15*a* and 15*b* between the first portion 7 and the second portion 9, and, in the piercing portion 3*a*, the first portion 7 and the first film 15*a* in contact with the first portion 7 can be adhered to each other, the second portion 9 and the second film 15*b* in contact with the second portion 9 can be adhered to each other, and the first film 15*a* and the second film 15*b* may not be adhered to each other.

FIG. 8A schematically shows a state where the piercing portion 3*a* is pierced by the injection needle 49 of the injector in order to suction the drug solution 47 into the injector. FIG. 8B schematically shows a state where the injection needle 49 is being pulled out after the drug solution 47 is suctioned into the injector. When the injection needle 49 is pulled out, the second portion 9 of the medical plug 1 can elastically deform by friction force due to the pull-out of the injection needle 49 so that a space 51 is generated between the first film 15*a* adhered to the first portion and the second film 15*b* adhered to the second portion. A residual liquid in the medical container that may have leaked from a gap formed through the piercing by the injection needle 49 is accommodated in the space 51. As a result, the residual liquid can be inhibited from leaking to the outside of the medical container.

EXAMPLES

Hereinafter, the present disclosure will be described in detail by means of examples, but the present disclosure is not limited to the following examples, and any of modifications and implementation modes made within the scope of the gist of the present disclosure is included in the scope of the present disclosure.

[Medical Plug No. 1]

Various additives such as a crosslinking agent, a filler, and a processing aid were blended with an isobutylene-isoprene rubber, and the resultant mixture was kneaded, to make an unvulcanized rubber sheet for forming first portions on leg portion sides of medical plugs.

An ETFE film having one surface subjected to surface roughening treatment was prepared as a film to be provided between the first portions and the second portions of the medical plugs. As shown in FIG. 5, the ETFE film 23 was stacked such that the roughened surface thereof was in contact with the unvulcanized rubber sheet 21. The obtained stack sheet was supplied between the lower mold portion 25*a* and the upper mold portion 25*b* of the primary mold heated to the rubber vulcanization temperature. At this time, the stack sheet was disposed such that: the ETFE film 23 faced the upper mold portion 25*b*; and the rubber sheet 21 faced the lower mold portion 25*a*.

Vulcanization molding was performed on the stack sheet through mold clamping between the lower mold portion 25*a* and the upper mold portion 25*b*. This led to formation of a primary molded product in which a plurality of the leg portions 5 were formed so as to be contiguous with each other by burrs 31. The entire surfaces on the upper sides of the leg portions 5, of the primary molded product, formed so as to be contiguous with each other were laminated with the ETFE film 23.

The individual leg portions 5 were stamped out of the primary molded product 33 having been formed, whereby plug intermediates 35 were made. In each plug intermediate 35, in order to cause the ETFE film 23 to remain only on the upper side of the piercing portion, the rest of the film was removed from the plug intermediate 35.

As shown in FIG. 6, an unvulcanized rubber sheet 37 for forming second portions of the medical plugs was prepared. As the unvulcanized rubber sheet 37, a rubber sheet having the same composition as that of the rubber sheet 21 forming the first portions was used.

The plug intermediates 35 made in the aforementioned step were supplied between the lower mold portion 39*a* having the plurality of recesses 41 each corresponding to the shape of the leg portion 5 and the upper mold portion 39*b* having the plurality of recesses 43 each corresponding to the shape of the flange portion 3*b*, of the secondary mold 39 heated to the rubber vulcanization temperature. Each plug intermediate 35 was set in the corresponding recess 41 of the lower mold portion 39*a*.

The rubber sheet 37 was stacked on the plug intermediates 35, and vulcanization molding was performed on the sheet 37 through mold clamping between the lower mold portion 39*a* and the upper mold portion 39*b*. This led to formation of a secondary molded product 38 in which: a plurality of the flange portions 3*b* corresponding to the above recesses 43 were formed so as to be contiguous with each other by burrs 45; and the plug intermediates 35 (leg portions 5) were adhered by vulcanization to the lower surfaces of the flange portions 3*b* formed so as to be contiguous with each other.

The individual capping portions were stamped out of the secondary molded product 38 having been formed, whereby medical plugs 1 were formed. Each medical plug 1 was cleaned, sterilized, dried, and used in a test. The medical plug No. 1 was such that, in the piercing portion, the film and the first portion were adhered to each other, and the film and the second portion were not adhered to each other.

[Medical Plug No. 2]

Medical plugs No. 2 were manufactured in the same manner as the medical plugs No. 1, except that a PTFE film was used instead of the ETFE film as the film to be provided between the first portions and the second portions.

[Medical Plug No. 3]

The various additives such as the crosslinking agent, the filler, and the processing aid were blended with the isobutylene-isoprene rubber, and the resultant mixture was kneaded, to make an unvulcanized rubber sheet for forming first portions on leg portion sides of medical plugs.

An ETFE film was prepared. The ETFE film was stacked on the unvulcanized rubber sheet. The obtained stack sheet was supplied between the lower mold portion 25*a* and the upper mold portion 25*b* of the primary mold heated to the rubber vulcanization temperature. At this time, the stack sheet was disposed such that: the ETFE film faced the lower mold portion 25*a*; and the rubber sheet faced the upper mold portion 25*b*.

Vulcanization molding was performed on the stack sheet through mold clamping between the lower mold portion 25*a* and the upper mold portion 25*b*. This led to formation of a primary molded product in which a plurality of the leg portions 5 were formed so as to be contiguous with each other by burrs 31. The entire surfaces on the lower sides of the leg portions 5, of the primary molded product, formed so as to be contiguous with each other were laminated with the ETFE film.

The individual leg portions 5 were stamped out of the primary molded product 33 having been formed, whereby plug intermediates 35 were made.

An unvulcanized rubber sheet 37 for forming second portions of the medical plugs was prepared. As the unvulcanized rubber sheet 37, a rubber sheet having the same composition as that of the rubber sheet 21 forming the first portions was used.

The rubber sheet 37 was stacked on the plug intermediates 35, and vulcanization molding was performed on the sheet 37 through mold clamping between the lower mold portion 39*a* and the upper mold portion 39*b*. This led to formation of a secondary molded product 38 in which: a plurality of the flange portions 3*b* corresponding to the above recesses 43 were formed so as to be contiguous with each other by burrs 45; and the plug intermediates 35 (leg portions 5) were adhered by vulcanization to the lower surfaces of the flange portions 3*b* formed so as to be contiguous with each other.

The individual capping portions were stamped out of the secondary molded product 38 having been formed, whereby medical plugs No. 3 were formed. Each medical plug No. 3 was cleaned, sterilized, dried, and used in a test.

[Medical Plug No. 4]

The various additives such as the crosslinking agent, the filler, and the processing aid were blended with the isobutylene-isoprene rubber, and the resultant mixture was kneaded, to make an unvulcanized rubber sheet for forming medical plugs. The rubber sheet was subjected to mold clamping between the upper mold portion and the lower mold portion, and medical plugs No. 4 were manufactured through a one-stage molding method. Each medical plug No. 4 was cleaned, sterilized, dried, and used in a test.

[Liquid Leakage Evaluation Test]

1) 21G manufactured by Terumo Corporation was used as an injection needle.

2) A medical plug for 2-mL vials, a 2-mL vial, an injector, a roll-fastening jig, and UF water (purified water having been purified through an ultrafiltration membrane) were prepared.

3) Each of the medical plugs No. 1 to No. 4 was attached to the vial, and an aluminum cap was rolled and fastened. As the aluminum cap, a new aluminum cap was used every time.

4) 1 ml of the UF water was poured into the injector.

5) The vial plugged with the medical plug, the injector, and the injection needle were each weighed by using a weighing machine.

6) The injection needle was attached to the injector, the piercing portion of the medical plug was pierced in a straight manner, and the UF water was injected into the vial.

7) The injector and the vial were inverted with the piercing portion being kept pierced by the injection needle, the injection needle was pulled out in a straight manner, and water on the injection needle was wiped off by using Kimwipes.

8) The vial plugged with the medical plug, the injector, and the injection needle were each weighed by using the weighing machine.

9) The total weight of the vial, the injector, and the injection needle having been weighed in "5)" was subtracted from the total weight of the vial, the injector, and the injection needle having been weighed in "8)", to calculate a liquid leakage amount.

10) The process from "2)" to "9)" was repeated five times, the injection needle being replaced with a new one after every time of process. The average value of liquid leakage amounts obtained by performing the process five times was indicated as a liquid leakage amount.

The liquid leakage amount in each of the medical plugs No. 1 to No. 3 was indicated as an index value with the liquid leakage amount in the medical plug No. 4 being regarded as 100.

Properties of the medical plugs No. 1 to No. 4 and the results of evaluating the liquid leakage amounts are indicated in Table 1.

TABLE 1

| | Medical plug No. | | | |
|---|---|---|---|---|
| | 1 | 2 | 3 | 4 |
| Rubber component of first portion | IIR | IIR | IIR | IIR |
| Rubber component of second portion | IIR | IIR | IIR | |
| Molding method | Two-stage molding method | Two-stage molding method | Two-stage molding method | One-stage molding method |

TABLE 1-continued

| | Medical plug No. | | | |
|---|---|---|---|---|
| | 1 | 2 | 3 | 4 |
| Number of films | 1 | 1 | 1 | None |
| Type of film | ETFE | PTFE | ETFE | — |
| Thickness of film (μm) | 50 | 50 | 50 | — |
| Film arrangement location | Between first portion and second portion | Between first portion and second portion | Surface of leg portion | — |
| Adhesion state | First portion/film | First portion/film | Leg portion/film | Integrally molded |
| Non-adhesion state | Second portion/film | Second portion/film | — | |
| Liquid leakage amount | 10 | 10 | 120 | 100 |

From Table 1, it can be seen that, in these examples, when the injection needle is pulled out from any of the medical plugs formed from the medical rubber composition according to one or more embodiments of the present disclosure, only a small amount of residual liquid in the medical container may leak from a gap formed through the piercing by the injection needle.

A medical plug according to aspect (1) of the present disclosure is a medical plug including: a capping portion; and a leg portion extending downward from the capping portion, wherein the medical plug includes a piercing portion in which a first portion located on the leg portion side and a second portion located on an upper surface side of the first portion are provided, and the first portion and the second portion are not adhered to each other.

A medical plug according to aspect (2) of the present disclosure is the medical plug according to aspect (1) of the present disclosure, wherein the medical plug includes one film between the first portion and the second portion, and, in the piercing portion, the film is adhered to one of the first portion and the second portion and not adhered to another one of the first portion and the second portion.

A medical plug according to aspect (3) of the present disclosure is the medical plug according to aspect (1) or aspect (2) of the present disclosure, wherein the medical plug includes at least two films between the first portion and the second portion, and, in the piercing portion, the first portion and a first film, out of the films, that is in contact with the first portion are adhered to each other, the second portion and a second film, out of the films, that is in contact with the second portion are adhered to each other, and the first film and the second film are not adhered to each other.

A medical plug according to aspect (4) of the present disclosure is the medical plug according to any one of aspects (1) to (3) of the present disclosure, wherein the capping portion has a shape of a disc and includes the piercing portion and a flange portion configured to be brought into contact with an upper rim surface of a port portion of a medical container.

A medical plug according to aspect (5) of the present disclosure is the medical plug according to any one of aspects (1) to (4) of the present disclosure, wherein the leg portion is provided within the flange portion of the capping portion.

A medical plug according to aspect (6) of the present disclosure is the medical plug according to any one of aspects (1) to (5) of the present disclosure, wherein a plurality of projections extend from an upper surface of the capping portion opposite the leg portion, and the plurality of projections are evenly spaced on the upper surface of the capping portion and concentric with a central longitudinal axis of the medical rubber plug in a plan view of the medical rubber plug.

A medical plug according to aspect (7) of the present disclosure is the medical plug according to any one of aspects (1) to (6) of the present disclosure, wherein the capping portion and the leg portion are formed in one piece.

A medical plug according to aspect (8) of the present disclosure is the medical plug according to any one of aspects (1) to (7) of the present disclosure, wherein the piecing portion is recessed from opposite sides via a first recess from an upper surface of the capping portion and a second recess from a lower surface of the leg portion.

A medical plug according to aspect (9) of the present disclosure is the medical plug according to any one of aspects (1) to (8) of the present disclosure, wherein the first and second recesses are coaxial at a center longitudinal axis of the medical rubber plug.

A medical plug according to aspect (10) of the present disclosure is the medical plug according to any one of aspects (1) to (9) of the present disclosure, wherein the piecing portion includes at least one film at an interface between the capping portion and the leg portion.

A medical plug according to aspect (11) of the present disclosure is the medical plug according to any one of aspects (1) to (10) of the present disclosure, wherein the piecing portion includes at least one film, the at least one film extends parallel to an upper surface of the capping portion and a lower surface of the leg portion opposite the upper surface, and the at least one film has opposite ends that are unexposed to outside the medical rubber plug and that terminate in the medical rubber plug.

A medical plug according to aspect (12) of the present disclosure is the medical plug according to any one of aspects (1) to (11) of the present disclosure, wherein the capping portion includes a flange portion, the flange portion forming an outer-most portion of the medical rubber plug in a radial direction of the medical rubber plug.

A plug according to aspect (13) of the present disclosure is a plug including: a capping portion; and a leg portion extending downward from the capping portion, wherein the plug includes a piercing portion in which a first portion located on a leg portion side and a second portion located on an upper surface side of the first portion are provided, and the first portion and the second portion are not adhered to each other.

A plug according to aspect (14) of the present disclosure is the plug according to aspect (13) of the present disclosure, wherein the plug includes only one film between the first portion and the second portion, and in the piercing portion, the one film is adhered to one of the first portion and the second portion and not adhered to the other one of the first portion and the second portion.

A plug according to aspect (15) of the present disclosure is the plug according to aspect (13) or aspect (14) of the present disclosure, wherein the plug includes at least two films between the first portion and the second portion, and in the piercing portion, the first portion and a first film, out of the at least two films, that is in contact with the first portion are adhered to each other, the second portion and a second film, out of the at least two films, that is in contact with the second portion are adhered to each other, and the first film and the second film are not adhered to each other.

A plug according to aspect (16) of the present disclosure is the plug according to any one of aspects (13) to (15) of the present disclosure, wherein the capping portion has a shape of a disc and includes: the piercing portion, and a flange portion configured to be brought into contact with an upper rim surface of a port portion of a medical container.

A plug according to aspect (17) of the present disclosure is the plug according to any one of aspects (13) to (16) of the present disclosure, wherein the leg portion is provided within the flange portion of the capping portion.

A plug according to aspect (18) of the present disclosure is the plug according to any one of aspects (13) to (17) of the present disclosure, wherein the piecing portion is recessed from opposite sides via a first recess from an upper surface of the capping portion and a second recess from a lower surface of the leg portion, and the first and second recesses are coaxial at a center longitudinal axis of the plug.

A plug according to aspect (19) of the present disclosure is the plug according to any one of aspects (13) to (18) of the present disclosure, wherein the piecing portion includes at least one film, the at least one film extends parallel to an upper surface of the capping portion and a lower surface of the leg portion opposite the upper surface, and the at least one film has opposite ends that are unexposed to outside the plug and that terminate in the plug.

A plug according to aspect (20) of the present disclosure is the plug according to any one of aspects (13) to (119) of the present disclosure, wherein the capping portion and the leg portion of the plug are made of a medical-grade rubber material.

What is claimed is:

1. A medical rubber plug comprising:

a capping portion; and a leg portion extending downward from the capping portion, wherein the medical rubber plug includes a piercing portion in which a first portion located on a leg portion side and a second portion located on an upper surface side of the first portion are provided, the first portion and the second portion are not adhered to each other, the medical rubber plug includes only one film between the first portion and the second portion, and in the piercing portion, the one film is adhered to one of the first portion and the second portion and not adhered to the other one of the first portion and the second portion.

2. The medical rubber plug according to claim 1, wherein the capping portion has a shape of a disc and includes:

the piercing portion, and a flange portion configured to be brought into contact with an upper rim surface of a port portion of a medical container.

3. The medical rubber plug according to claim 2, wherein the leg portion is provided within the flange portion of the capping portion.

4. The medical rubber plug according to claim 1, wherein a plurality of projections extend from an upper surface of the capping portion opposite the leg portion, and the plurality of projections are evenly spaced on the upper surface of the capping portion and concentric with a central longitudinal axis of the medical rubber plug in a plan view of the medical rubber plug.

5. The medical rubber plug according to claim 1, wherein the capping portion and the leg portion are formed in one piece.

6. The medical rubber plug according to claim 1, wherein the piercing portion is recessed from opposite sides via a first recess from an upper surface of the capping portion and a second recess from a lower surface of the leg portion.

7. The medical rubber plug according to claim 6, wherein the first and second recesses are coaxial at a center longitudinal axis of the medical rubber plug.

8. The medical rubber plug according to claim 1, wherein the piercing portion includes at least one film at an interface between the capping portion and the leg portion.

9. The medical rubber plug according to claim 1, wherein the piercing portion includes at least one film, the at least one film extends parallel to an upper surface of the capping portion and a lower surface of the leg portion opposite the upper surface, and the at least one film has opposite ends that are unexposed to outside the medical rubber plug and that terminate in the medical rubber plug.

10. The medical rubber plug according to claim 1, wherein the capping portion includes a flange portion, the flange portion forming an outer-most portion of the medical rubber plug in a radial direction of the medical rubber plug.

11. A plug comprising:

a capping portion; and a leg portion extending downward from the capping portion, wherein the plug includes a piercing portion in which a first portion located on a leg portion side and a second portion located on an upper surface side of the first portion are provided, and the first portion and the second portion are not adhered to each other, the plug includes at least two films between the first portion and the second portion, and in the piercing portion, the first portion and a first film, out of the at least two films, that is in contact with the first portion are adhered to each other, the second portion and a second film, out of the at least two films, that is in contact with the second portion are adhered to each other, and the first film and the second film are not adhered to each other.

12. The plug according to claim 11, wherein the capping portion has a shape of a disc and includes:

the piercing portion, and a flange portion configured to be brought into contact with an upper rim surface of a port portion of a medical container.

13. The plug according to claim 12, wherein the leg portion is provided within the flange portion of the capping portion.

14. The plug according to claim 11, wherein the piercing portion is recessed from opposite sides via a first recess from an upper surface of the capping portion and a second recess from a lower surface of the leg portion, and the first and second recesses are coaxial at a center longitudinal axis of the plug.

15. The plug according to claim 11, wherein the piercing portion includes at least one film, the at least one film extends parallel to an upper surface of the capping portion and a lower surface of the leg portion opposite the upper surface, and the at least one film has opposite ends that are unexposed to outside the plug and that terminate in the plug.

16. The plug according to claim 11, wherein the capping portion and the leg portion of the plug are made of a medical-grade rubber material.

17. A medical rubber plug comprising:

a capping portion; and a leg portion extending downward from the capping portion, wherein the medical rubber plug includes a piercing portion in which a first portion located on a leg portion side and a second portion located on an upper surface side of the first portion are provided, the first portion and the second portion are not adhered to each other, the medical rubber plug includes at least two films between the first portion and the second portion, and in the piercing portion, the first portion and a first film, out of the at least two films, that is in contact with the first portion are adhered to each other, the second portion and a second film, out of the at least two films, that is in contact with the second portion are adhered to each other, and the first film and the second film are not adhered to each other.

* * * * *